May 20, 1930.  B. T. ANDREN  1,759,427

ELECTRICALLY WELDED PIPE AND METHOD OF MANUFACTURING THE SAME

Filed Feb. 20, 1929

INVENTOR.
BIRGER T. ANDREN
BY
ATTORNEY.

Patented May 20, 1930

1,759,427

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

ELECTRICALLY-WELDED PIPE AND METHOD OF MANUFACTURING THE SAME

Application filed February 20, 1929. Serial No. 341,428.

This invention relates to electrically welded pipe and method of manufacturing the same.

The invention particularly relates to arc welding of longitudinal seams in sheet metal pipe wherein a welding groove is provided between the edges to be welded and an electric arc is employed to fuse metal into said groove and weld the edges together.

The object of the invention is to provide an electrically arc welded sheet metal pipe wherein the weld is substantially stronger than the sheet metal from which the pipe is formed.

Another object is to provide an improved method of electrically welding sheet metal edges.

The invention may be more readily understood by reference to the accompanying drawing in which.

Figure 1:
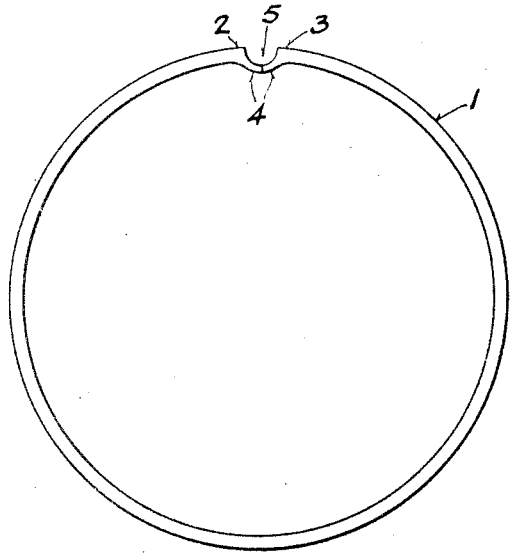
Figure 1 is an end elevation of a tubular pipe section prepared for the welding operation.

In the manufacture of pipe, I preferably convert a flat metal sheet of suitable dimensions into a tubular blank 1 with side edges 2 and 3 thereof meeting in welding relation, as illustrated in Figure 1. The edges are scarfed providing integral projections 4 thereon which meet below the lower normal plane of the edges to constitute the bottom of a welding groove 5 provided between the edges. The groove has a depth not less than the thickness of the parent sheet metal. The edges may be scarfed in any suitable manner either prior to converting the sheet metal blank into tubular form or subsequent thereto.

Figure 2:
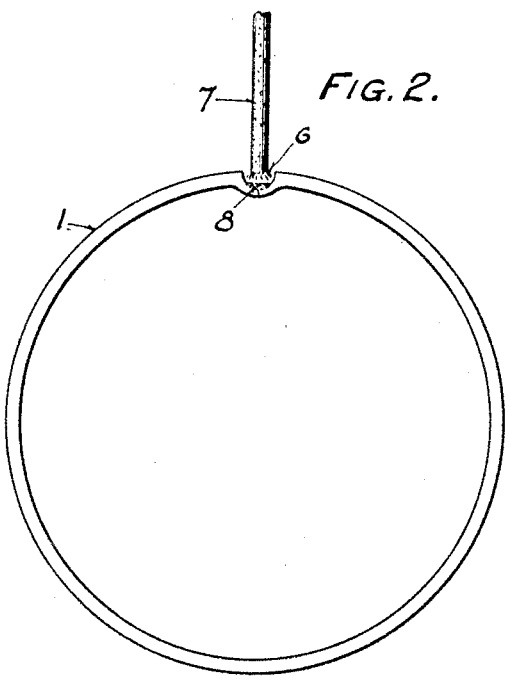
Fig. 2 is a similar elevation illustrating the welding operation.

I weld the edges together by depositing metal in the welding groove, as illustrated in Fig. 2. An electric arc 6 is established between the work and a suitable metallic electrode 7 which latter is fused by the arc to deposit fusing welding metal 8 in the groove. The deposited metal fuses with the bottom and side walls of the groove and welds the edges to form an integral tubular structure. As many passes may be made by the arc longitudinally along the groove as are necessary to fill the groove with deposited metal, and if desirable, form a bead on top of the weld.

Figure 3:
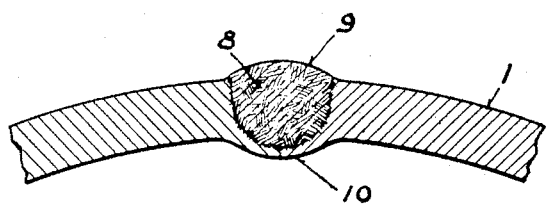
Fig. 3 is an enlarged section of the finished weld.

The weld thus provided, as illustrated in Fig. 3 has an integral bead 9 formed from deposited metal 8 on the top thereof and an integral bead 10 formed from the projections 4 and fused metal at the bottom thereof. The weld is substantially thicker than the sheet metal adjacent thereto and is uniformly distributed between and on opposite sides of the sheet metal. The beads tend to reinforce the weld and give it added strength.

The bottom of the groove may be formed integral with only one edge or a thin sheet strip may be employed beneath the edges to provide a recess therebetween for receiving the welding metal.

Figure 4:
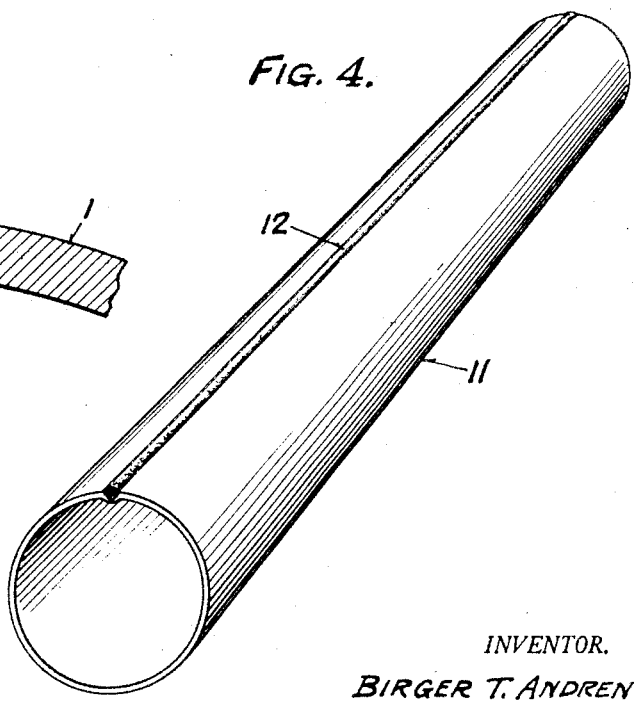
Fig. 4 is a perspective view of the welded pipe section.

By my improved method of electric arc welding, I manufacture pipe as illustrated in Fig. 4 having a sheet metal tubular body 11 and a longitudinal welded seam 12 of substantially greater thickness than the sheet metal from which the pipe is formed and having a bead on the inside and on the outside of the pipe at the weld.

In case it is found advisable, the beads of the weld may be removed subsequent to the welding operation or the groove need not be filled sufficiently to form the upper bead.

The invention may have various modifications and adaptations within the scope of the claims, it being understood that the novel method of electric arc welding provided thereby may be applied to the welding of other articles than sheet metal pipe.

I claim:

1. The method of electric arc welding metal sheets which comprises forming integral projections on the edges thereof, said projections meeting below the normal lower plane of said edges to provide a welding groove therebetween, and depositing metal in the said groove by means of an electric arc and a fusible metallic electrode to thereby fuse said edges and provide an integrally welded sheet metal structure.

2. In the manufacture of pipe formed from sheet metal and having a longitudinal welded seam, the steps of providing projecting lips integral with the longitudinal edges to be welded, bending said lips downwardly so that the welding groove provided between the edges is closed at its bottom by said lips meeting below the lower plane of the edges being welded, and depositing weld metal in the groove thus provided to weld the edges and produce an integral sheet metal pipe.

3. In the manufacture of pipe formed from sheet metal and having a longitudinal welded seam, the steps of providing projecting lips integral with the longitudinal edges of a flat sheet metal blank, converting the blank into tubular form with the longitudinal edges meeting to provide a welding groove therebetween, bending said projecting lips downwardly to deepen said welding groove, and depositing weld metal in said deepened weld groove from a fusible metallic electrode by means of an electric arc to provide a longitudinal welded seam having a strengthening bead both above and below the same.

4. An electric arc welded sheet metal pipe comprising a sheet metal tubular body having the longitudinal edges thereof aligned and joined by deposited weld metal, said edges having integral projections meeting at the bottom of the weld and below the lower plane of said edges, and the deposited weld metal being fused with the metal of said projections and edges and providing a bead at the top of the weld.

In testimony whereof, I have signed my name at Los Angeles, California, this fifth day of February, 1929.

BIRGER TORVALD ANDREN.